United States Patent
Marawi et al.

(10) Patent No.: US 12,467,218 B2
(45) Date of Patent: Nov. 11, 2025

(54) BUILDING FOUNDATION AND SOIL STABILIZATION METHOD AND SYSTEM

(71) Applicant: Aquadation LLC, Austin, TX (US)

(72) Inventors: Bassam Marawi, Austin, TX (US); Omar Besim Hakim, Austin, TX (US)

(73) Assignee: Aquadation LLC, Austin, TX (US)

( * ) Notice: Subject to any disclaimer, the term of this patent is extended or adjusted under 35 U.S.C. 154(b) by 0 days.

(21) Appl. No.: 18/655,123

(22) Filed: May 3, 2024

(65) Prior Publication Data

US 2024/0279898 A1    Aug. 22, 2024

Related U.S. Application Data

(60) Division of application No. 18/171,251, filed on Feb. 17, 2023, now abandoned, which is a continuation of
(Continued)

(51) Int. Cl.
| | |
|---|---|
| E02D 31/02 | (2006.01) |
| C04B 28/00 | (2006.01) |
| C04B 111/00 | (2006.01) |
| C09K 17/08 | (2006.01) |
| C09K 17/10 | (2006.01) |
| E02D 3/00 | (2006.01) |
| E02D 3/12 | (2006.01) |
| E02D 17/02 | (2006.01) |
| E02D 17/04 | (2006.01) |

(Continued)

(52) U.S. Cl.
CPC ............ *E02D 31/02* (2013.01); *C04B 28/001* (2013.01); *C09K 17/08* (2013.01); *E02D 3/005* (2013.01); *E02D 3/12* (2013.01); *E02D 17/02* (2013.01); *E02D 17/04* (2013.01); *E02D 19/00* (2013.01); *E02D 19/22* (2013.01); *C04B 2111/00732* (2013.01); *C09K 17/10* (2013.01); *E02D 2250/0023* (2013.01); *E02D 2300/0006* (2013.01); *E02D 2300/002* (2013.01); *E02D 2300/0026* (2013.01); *E02D 2300/0079* (2013.01)

(58) Field of Classification Search
CPC .......... E02D 3/005; E02D 3/12; E02D 19/00; E02D 31/02; C09K 17/00
See application file for complete search history.

(56) References Cited

U.S. PATENT DOCUMENTS

| | | |
|---|---|---|
| 468,228 A | 2/1892 | Robinson |
| 3,797,738 A | 3/1974 | Fitzhugh |
| | (Continued) | |

FOREIGN PATENT DOCUMENTS

| | | |
|---|---|---|
| DE | 3633473 | 4/1987 |
| DE | 102010047831 | 4/2012 |
| | (Continued) | |

*Primary Examiner* — Gisele D Ford
(74) *Attorney, Agent, or Firm* — Robert C. Kowert; Kowert, Hood, Munyon, Rankin & Goetzel, P.C.

(57) ABSTRACT

System and means soil stabilization and moisture control for building foundations including methods and systems for stabilization moisture in a site for building foundation by applying soil moisture stabilization material in various forms, a preferred stabilization material being a mixture of aluminosilicate Pozzolan mineral and granular material such as sand.

20 Claims, 9 Drawing Sheets

Related U.S. Application Data application No. 16/945,581, filed on Jul. 31, 2020, now Pat. No. 11,585,066, which is a continuation of application No. 16/105,302, filed on Aug. 20, 2018, now Pat. No. 10,731,316, which is a continuation of application No. 15/464,218, filed on Mar. 20, 2017, now Pat. No. 10,053,834, which is a continuation of application No. 14/718,967, filed on May 21, 2015, now Pat. No. 9,598,834, which is a continuation of application No. 13/870,283, filed on Apr. 25, 2013, now Pat. No. 9,074,340.

(60) Provisional application No. 61/801,305, filed on Mar. 15, 2013, provisional application No. 61/778,822, filed on Mar. 13, 2013, provisional application No. 61/761,505, filed on Feb. 6, 2013.

(51) Int. Cl.
*E02D 19/00* (2006.01)
*E02D 19/22* (2006.01)

(56) References Cited

U.S. PATENT DOCUMENTS

| | | | |
|---|---|---|---|
| 3,898,843 A * | 8/1975 | Waterston | E02B 13/00 251/145 |
| 3,946,762 A * | 3/1976 | Green | A01G 25/06 405/44 |
| 4,015,432 A | 4/1977 | Ball | |
| 4,063,523 A | 12/1977 | Olsson | |
| 4,100,861 A | 7/1978 | Olsson | |
| 4,194,691 A | 3/1980 | Birnbach et al. | |
| 4,508,472 A | 4/1985 | Handy et al. | |
| 4,534,143 A * | 8/1985 | Goines | E02D 31/02 405/36 |
| 4,549,277 A | 10/1985 | Brunson et al. | |
| 4,620,398 A | 11/1986 | Wallin | |
| 4,684,920 A | 8/1987 | Reiter | |
| 4,878,781 A | 11/1989 | Gregory et al. | |
| 4,879,852 A | 11/1989 | Tripp | |
| 4,930,934 A * | 6/1990 | Adkins | E02B 13/00 405/39 |
| 5,156,494 A | 10/1992 | Owens et al. | |
| 5,195,282 A | 3/1993 | Campbell | |
| 5,820,302 A | 10/1998 | Roberts et al. | |
| 5,904,447 A | 5/1999 | Sutton et al. | |
| 5,970,665 A | 10/1999 | Oudman | |
| 6,042,305 A | 3/2000 | Birnbach et al. | |
| 6,076,997 A | 6/2000 | First et al. | |
| 6,082,932 A | 7/2000 | Anderson | |
| 6,558,078 B2 * | 5/2003 | Sowry | A01G 25/06 405/39 |
| 6,991,408 B2 | 1/2006 | Bottriell et al. | |
| 7,357,602 B2 | 4/2008 | Ferraiolo | |
| 7,651,294 B2 | 1/2010 | Maier | |
| 8,070,980 B2 | 12/2011 | Vitale et al. | |
| 8,562,250 B2 * | 10/2013 | Niemczyk | E21B 7/02 405/48 |
| 8,577,628 B2 | 11/2013 | Caicedo et al. | |
| 8,882,905 B1 | 11/2014 | Peters et al. | |
| 9,074,340 B2 | 7/2015 | Marawi et al. | |
| 9,267,862 B1 | 2/2016 | Kavars et al. | |
| 9,598,834 B2 | 3/2017 | Marawi et al. | |
| 10,053,834 B2 | 8/2018 | Marawi et al. | |
| 10,526,763 B2 | 1/2020 | Conner et al. | |
| 10,731,316 B2 | 8/2020 | Marawi et al. | |
| 2002/0049517 A1 | 4/2002 | Ruffner | |
| 2006/0021235 A1 | 2/2006 | Becker | |
| 2007/0044402 A1 | 3/2007 | Hess | |
| 2007/0094964 A1 * | 5/2007 | Stender | F24F 5/0075 52/302.1 |
| 2008/0061959 A1 | 3/2008 | Breed | |
| 2010/0031522 A1 | 2/2010 | Ammann | |
| 2010/0238027 A1 | 9/2010 | Bastianini | |
| 2011/0063107 A1 | 3/2011 | Tzonev et al. | |
| 2011/0308175 A1 | 12/2011 | Wu | |
| 2012/0107056 A1 | 5/2012 | Hecht et al. | |
| 2013/0278377 A1 | 10/2013 | Slupsky et al. | |
| 2014/0190255 A1 | 7/2014 | Larigani | |
| 2014/0310967 A1 | 10/2014 | Nagornov | |
| 2015/0151050 A1 | 6/2015 | Estes | |
| 2015/0355050 A1 | 12/2015 | Yoshida et al. | |
| 2015/0359185 A1 | 12/2015 | Guy | |
| 2017/0363503 A1 | 12/2017 | Tothill et al. | |
| 2018/0209113 A1 | 7/2018 | Birtele | |
| 2023/0203776 A1 | 6/2023 | Marawi et al. | |

FOREIGN PATENT DOCUMENTS

| | | |
|---|---|---|
| EP | 1956147 | 8/2008 |
| EP | 2147592 | 1/2010 |
| JP | H08218410 | 8/1996 |
| WO | 2009063523 | 5/2009 |
| WO | 2009121169 | 10/2009 |

* cited by examiner

BUILDING FOUNDATION AND SOIL STABILIZATION METHOD AND SYSTEM

CROSS REFERENCE TO RELATED APPLICATIONS

This application is a divisional of U.S. patent application Ser. No. 18/171,251, filed Feb. 17, 2023, which is a continuation of U.S. patent application Ser. No. 16/945,581, filed Jul. 31, 2020, now U.S. Pat. No. 11,585,066, which is a continuation of U.S. patent application Ser. No. 16/105,302, filed Aug. 20, 2018, now U.S. Pat. No. 10,731,316, which is a continuation of U.S. patent application Ser. No. 15/464,218, filed Mar. 20, 2017, now U.S. Pat. No. 10,053,834, which is a continuation of U.S. patent application Ser. No. 14/718,967 filed May 21, 2015, now U.S. Pat. No. 9,598,834, which is a continuation application of U.S. application Ser. No. 13/870,283, filed Apr. 25, 2013, now U.S. Pat. No. 9,074,340, which claims benefit under 35 U.S.C. § 119(e) of U.S. Provisional Patent Application No. 61/778,822, filed Mar. 13, 2013, U.S. Provisional Patent Application No. 61/761,505, filed Feb. 6, 2013, and U.S. Provisional Patent Application No. 61/801,305, filed Mar. 15, 2013, the disclosures of each of which are hereby incorporated by reference in their entirety for all purposes.

BACKGROUND

Field of the Invention

The present invention relates to building foundation soil stabilization and moisture control and more specifically, to methods and systems for stabilization moisture in a site for building foundation by applying soil moisture stabilization material in various forms.

Background

The expansion and contraction of soil is a significant factor in causing damage to the foundations of buildings and other structures. Such expansion and contraction results from changes in the moisture content of the soil which are particularly evident in clay and other heavy soils. The changes in volume of the soil can place undesirable forces upon a foundation so as to cause structural damage.

Moisture content of soil can change for a variety of reasons. For example, water can be removed from the soil by the processes of transpiration via the presence of vegetation, evaporation and gravity. Such processes can create areas of localized water depletion as well as larger area wet/dry cycles that can cause a foundation to sag, lift, crack and move, eventually leading to structural failure.

Attempts previously been made to stabilize the moisture content of soil around foundations: see U.S. Pat. No. 4,534,143 to Goines et al. that discloses a soil moisture stabilization system comprising two circumferential zones around a house, where one circumferential zone is placed approximately three feet below the other; U.S. Pat. No. 4,878,781 to Gregory et al. that discloses a moisture control system comprising a plurality of supply pipes, accumulator pipes, and porous pipes for supplying water, storing water and allowing water to seep into surrounding soil; and U.S. Pat. No. 5,156,494 to Owens et al. that discloses a soil moisture stabilization system that operates based on stress sensors placed on the foundation. Water is injected into the soil around a foundation when the stress sensors detect abnormal levels of stress.

Despite these efforts, there is a need for the development of an effective foundation and soil moisture stabilization system and methods. There is a particular need for a system that can optimize soil saturation and control specific sections around a structure that may need differing levels of moisture to achieve saturation.

SUMMARY OF THE INVENTION

A system and method for building foundation moisture control has been disclosed in U.S. Pat. No. 6,558,078, May 6, 2003 and U.S. Pat. No. 7,018,134, Mar. 28, 2006 using porous pipe as means for transporting liquid to the zones. The present invention is a cost effective and more reliable solution for delivering moisture around foundations and preventing soil movement.

Distribution of moisture is supplied to the system of the invention by trenches or ditches adjacent to the building foundation in which the trench is filed with a granular material with a liquid retention component.

In one aspect of the invention there is provided a method of foundation irrigation comprising the installation of one or more independent zones of liquid distribution trenches around a building foundation, feeding at least one section in each of the independent zones, and controlling the flow of liquid to the zones to allow each zone to deliver water independently of other zones. Independent irrigation zones will contribute to better management of foundation leveling since one side of the house might require more or less moisture than a different side.

Feeding the independent zones can be done by center-feeding, feeding at one-end, both ends, and any combination thereof. Optimal moisture delivery can be achieved through an automated system to detect soil moisture and add/shut off irrigation event based on soil moisture reading or through user intervention.

BRIEF DESCRIPTION OF THE DRAWING

Embodiments of the invention is described with reference to the several figures of the drawing, in which.

DETAILED DESCRIPTION

Figure 1:
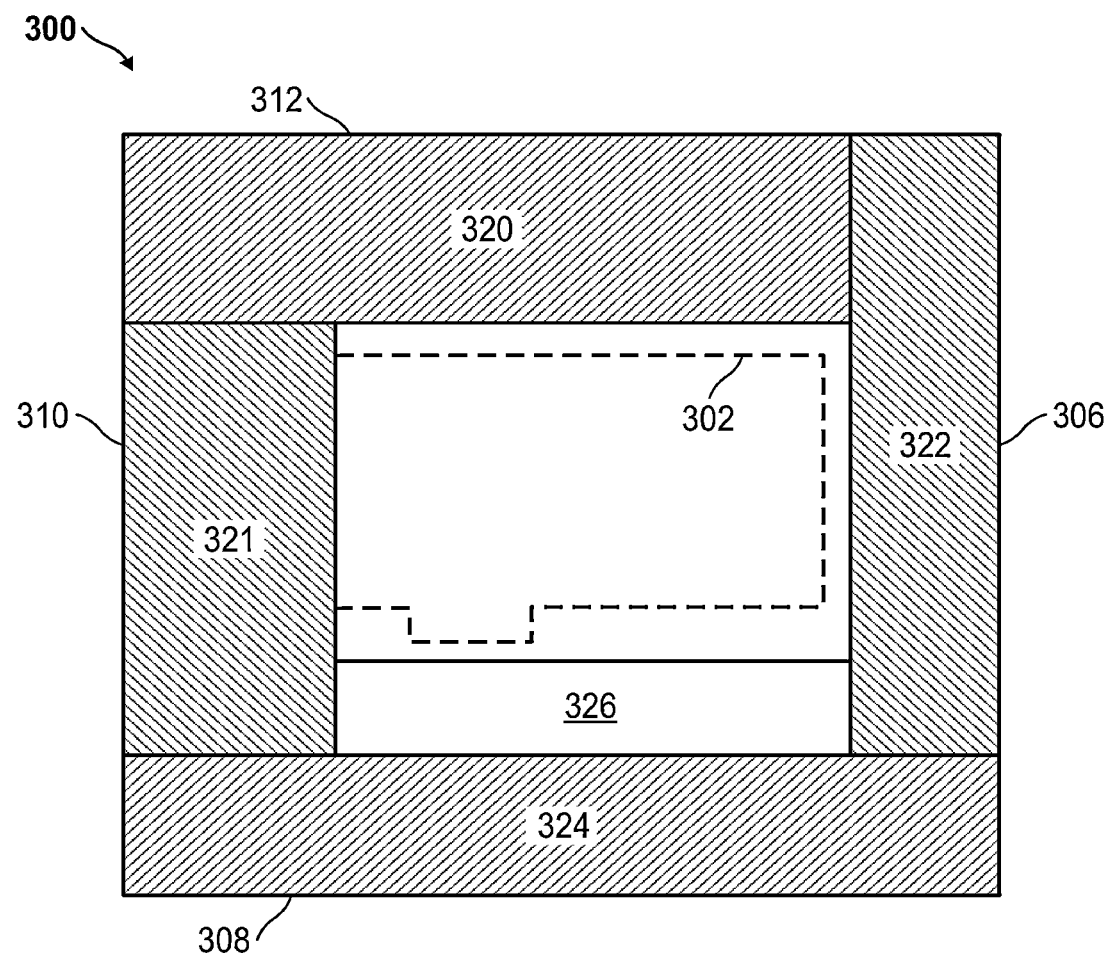
FIG. 1 is a schematic plan view of a building site on which embodiments of the invention may be practiced.

The present invention provides a soil moisture stabilization system and method for use in, under and around building foundations. In broad aspect the invention provides moisture stabilization of the soil of a building site, particularly the section of the site on which building foundations and paving are located, to alleviate shifting of the soil and other adverse effects that occur when soil moisture levels significantly changes over short periods of time. The system and method involves the application of a soil moisture stabilization material, either to the entire site, the site location on which a foundation is to be placed, or around an existing building foundation. "Soil moisture stabilization material" as the term is used in this specification and claims means a material that changes the properties of the soil and/or clay such that the soil's ability to retain and/or transport moisture is either enhanced or diminished, depending upon the desired effect. An "effective" amount of soil moisture stabilization material to effect a measurable enhancement of soil moisture stabilization capacity—to retain or transfer moisture as desired.

The beneficial effect of the soil stabilization system and method of this invention is to improve the performance of indigenous soil or added soil to a building site to enhance retention of moisture and aid or retard liquid transmission through the soil to provide a more stable and suitable foundation base that is less subject to expansion and contraction with ambient moisture conditions.

Since adequate building foundations are often "engineered", that is designed for structure, load and the like, including conditioning of the indigenous soil of the site, it is desirable to be able to "certify" (and/or warrant) the soil enhancements to ensure proper application and construction. This in accomplished in this invention by providing distinctive markings such as visual identifiers including tags, coloring to the soil moisture stabilization material, small unique plastic pieces, beads, distinctive granular material and the like or adding to the material RFID chips. RFID chips are relatively inexpensive and may be associated with identifiers to allow monitoring of a variety of desirable information such as source, intellectual property rights and obligations, date of manufacture, date of application, composition, quantity of application and the like. In one aspect there is also provided a warranty system for assuring integrity of the foundation resulting from the application of the system and methods of this invention. Such a warranty method is disclosed in U.S. application Ser. No. 61/801,305, filed Mar. 15, 2013, the disclosure of which is incorporated by reference for all purposes. The marking assist in accomplishing the objectives of the warranty.

In one set of embodiments the soil moisture stabilization material will contain the mineral pozzolan and preferably pozzolan plus granular material as further described in addition embodiment described below.

Clay and hardpan soils may present special problems in stabilizing indigenous soils. Clays generally result in poor drainage, soggy soil, and soil compaction. In clay soils a number of liquid and solid amendments will be beneficial, including the use of gypsum. Gypsum can penetrate the millions of fine clay particles in heavy or hardpan type soils and loosen the soil structure. This process then creates air and moisture spaces that eventually loosen and break-up the soil structure. Gypsum is especially suitable as it neutral, non-toxic to humans and animals and does not burn. It may be added to the top of the soil or into the soil stabilization material describe herein.

In one set of embodiments a building site is provided with soil moisture stabilization material (fill) applied to an entire building site or to selected sections of the site. These embodiments may be applied before a building foundation is placed on the site or for selected sections after a foundation is placed on the site. FIG. 1 shows a building site 300 on which a building 302 is to be placed (or has been placed). The site has boundaries 306, 308, 310 and 312. Moisturization means such as soil stabilization material may be placed on the entire surface (and/or subsurface) of the site prior to placement of a building.

Figure 4:
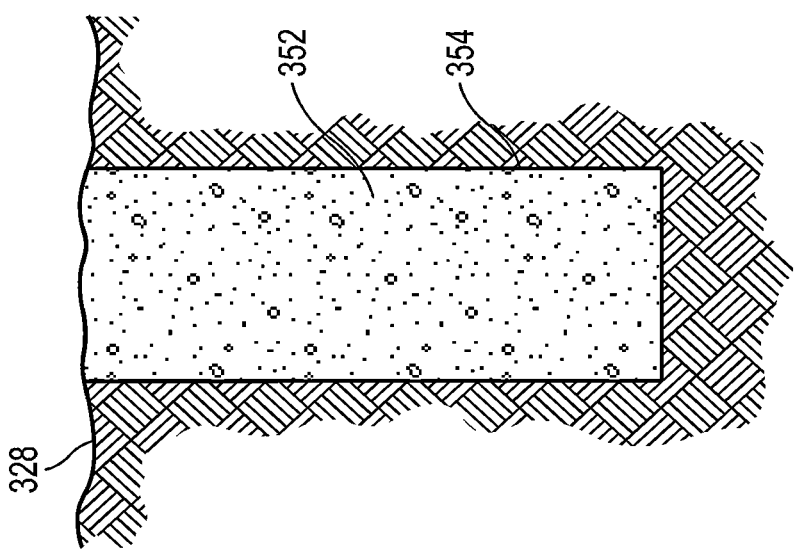
FIG. 4 is a schematic of a cross section of ground on a building site on which embodiments of the invention may be practiced.
Figure 3:
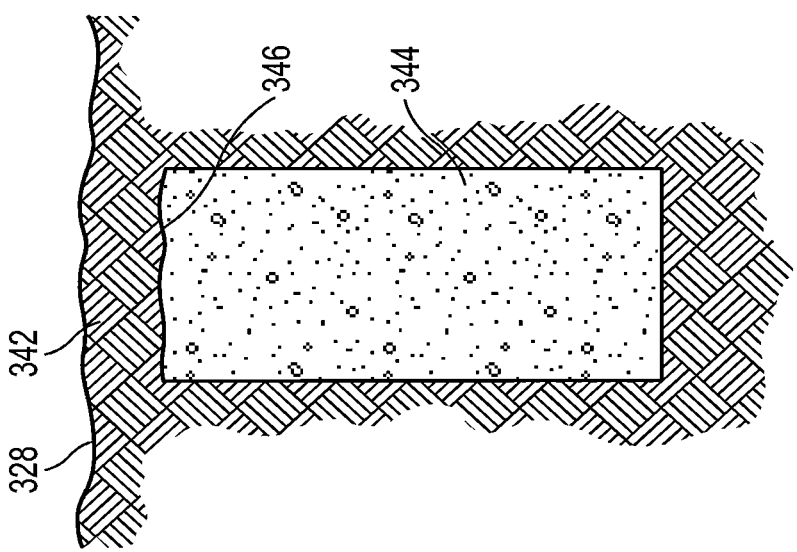
FIG. 3 is a schematic of a cross section of ground on a building site on which embodiments of the invention may be practiced.
Figure 2:
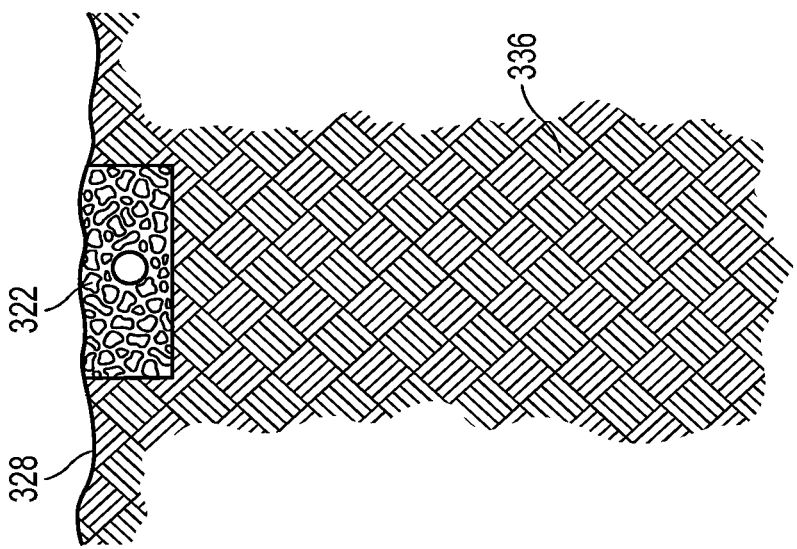
FIG. 2 is a schematic of a cross section of ground on a building site on which embodiments of the invention may be practiced.

Referring to FIG. 1 stabilization fill may, for example, be applied to section 320, 321, 322, 324 and/or 326 or on any combination of these sections. The stabilization fill may be placed on the surface of the soil of the site as shown in FIG. 2 where the soil grade level is 328, the fill is 332 and the soil is 336. The fill may also be placed only on the sub-surface as shown in FIG. 3 where 328 is the grade level soil, 342 the fill and 346 soil (indigenous or supplied). FIG. 4 illustrates the fill both at the surface, 328, and subsurface (352). In general, surface fill will be about 2 to 8 inches deep from grade level, and in-ground fill will be to a depth of about 8 to 36 inches from grade.

Applying a soil moisture stabilization material ("fill") to the entire site (or large sections of the site) before the building foundation is placed aids in moisture retention and stabilization at a relatively constant level without the need to constantly monitor and supply moisture as is needed with other embodiments described above. While supplemental moisture may occasionally be needed the building foundation and paving when placed on the site will partially seal in the moisture stabilization fill to provide a sub-foundation that is much less subject to heaving and contraction with changes in ambient moisture conditions.

However, the soil moisture stabilizer material may be irrigated based on controlled schedule (based on numerous criteria as discussed in more detail below) using drip irrigation means as the liquid delivery, top irrigation or any other irrigation method that may be scheduled and controlled. Supplemental moisture may be supplied by drip lines arranged in zones (outside the building foundation and paved areas) and controlled in the same manner. Alternatively, conduits that supply liquid in small quantities as drip systems do may be placed under the soil moisture stabilization material or above the material to supply moisture as needed. This may be done with a grid or ziz-zag pattern of conduits that are connected to a liquid supply. The amount and timing of supplying liquid may be controlled in various ways as is explained for the system of irrigation of existing foundations described in detail below. The irrigation conduit may also be used to transport and distribute other fluids such as pesticides or liquid fertilizers, for example in a garden or flower bed grown alongside a home or other structure.

Moisture barriers may be placed around the fill to prevent migration of moisture to adjacent or unwanted area of the site. For example, barriers may be placed at the building site boundaries. Items 344 and 354 in FIGS. 3 and 4, cross section views of fill material, illustrate one placement of barriers. Barriers may be also placed on the top, bottom or sides of the fill when it is placed in sections of the site. The same materials for barriers, plastic, metal, concrete, etc, as described for the embodiments described hereafter are suitable.

An advantage of the whole or sectional moisturization is that the soil moisture stabilization material (such as sand and pozzolan fill) is an excellent planting material that provides good soil for planting and since the fill retains moisture, is very moisture efficient.

Thus, in practice, in these embodiments, a building site will be graded to the desired grade, excavated to the depth desired for the moisturization fill, the fill added and leveled and the building foundation and paving installed. For foundations that are to be placed partially below grade, the fill will be place beneath the level of the base of the foundation and/or mixed with the soil (indigenous or added from offsite) so that the fill will provide soil moisturization stability and soil stability for the foundation.

In some applications it will be desirable that the fill will be soaked with liquid (usually water) and left to stand (either open or covered as with canvas or polymer sheet) until the moisture level has stabilized before the building foundation and paving is installed.

In many building projects the foundation is poured on a granular base such as sand that is contoured to form molds for built-in concrete beams (usually reinforced by rebar). This kind of granular foundation formation may be supplemented with soil moisture stabilization fill as described above.

In another aspect the fill as described may be added to the entire site or to sections as "soil amendments" to improve clay soil reaction to moisture change and to stabilize the soil from movement with ambient moisture change. The same considerations, materials and compositions described below for the set of embodiments where the soil moisture stabilizations material (fill) is placed in slug or in trenches around an existing foundation applies to this set of embodiments.

It has been found that the water retention agent pozzolan is excellent in stabilizing clay soils. Other additives including gypsum may also be beneficially added for clay or heavy soils. Thus, a preferred soil moisture stabilization material will be a granular material admixed with a moisture retaining material. The granular material may suitably be sand, finely divided gravel, crushed lava rock, crushed stone, rock, plastic pellets and the like. Generally some form of sand will be very suitable. The water retention component is a material that aids the porous material in retaining liquid so that it is passes through the granular material (and out) much slower than it would otherwise. "Pozzolan" has been found to be a very suitable water retention component. Pozzolan is a soil amendment mineral that helps increase the water holding capacity of a sandy and droughty soil. See Abiye Yassin Ibrahim; Effect of a Water Retention Material "Pozzolan" on the Soil Water Balance of Sand and Loamy Sand; University of Ghent, Free University of Brussels; Academic Year 1999-2000, the disclosures of which are incorporated herein by reference. See also Weeks, J. D. et al; Bentgrass Establishment in Sand-base Rootzones Using Subsurface Drip Irrigation; Texas Tech University; publically available and may be found at http://www.technogreencorp.com/TexasTechStudy.pdf, the disclosures of which are incorporated herein by reference. The Texas Tech paper describes test for soil amendment with various sands—sands that would all be suitable for use in this invention. Pozzolan, has been found useful in improving areas that normally require a significant amount of watering. Since Pozzolan has an adequate saturated hydraulic conductivity, it is incorporated into a granular fill. The fill acts as source of capillary conductive medium providing moisture to adjacent soil. Mix ratios are preferably custom designed based on the particle size distribution and type of sand that is used. In general, the mix would be in the range of 50-90% sand and 10-50% Pozzolan and more suitably from about 15 to 30% Pozzolan. A composition of 20% Pozzolan and 80% sand has been found to provide a good balance of properties.

A preferred Pozzolan for the present invention is a Pozzolan mineral called "Lassenite". "Lassenite is a mineral, mined from a deposit in California. Lassenite is a Pozzolan, a crystalline, porous aluminosilicate and thus its composition includes aluminum, silicon, and oxygen. It was formed when Mt. Lassen erupted 26,000,000 years ago filling a diatomaceous filled fresh water lake with compacted and solidified volcanic ash. Structurally, the diatomic remains are amorphous silicon dioxide (glass). Lassenite is relatively unique, as most Pozzolan deposits throughout the world are contaminated with heavy metals from the volcano or salts from the ocean (see information from AquaFirst Technologies Inc.). Lassenite is currently used as an amendment to landscaping soils because of its water retention properties and has been utilized as an innovative water conservation method in the non-turf landscaping around the Pacific Institute for Sports Excellence at the Interurban Campus of Camosun College." Taken from a write-up that is publically available and can also be found at http://www.aquafirst.ca/lassenite_.html.

In general, it is expected that the moisturization stabilization fill will be delivered to the site either as components to be mixed on site or premixed. Containerized premixed fill may be used but is expected to be less advantageous than for the trench embodiments described below.

In another set of embodiments and as an alternative to mixing soil moisture stabilization material fill into the soil of an entire tract or into section of a tract, the fill may be placed is discrete holes (or slugs) in selected segments of the site. The stabilizing fill (preferably sand and pozzolan) will distribute the water evenly and the water retention agent helps retain the water in the granular medium. This provides a reservoir for the soil to slowly and by capillary action feed from moisture provided in the mix.

Figure 5:
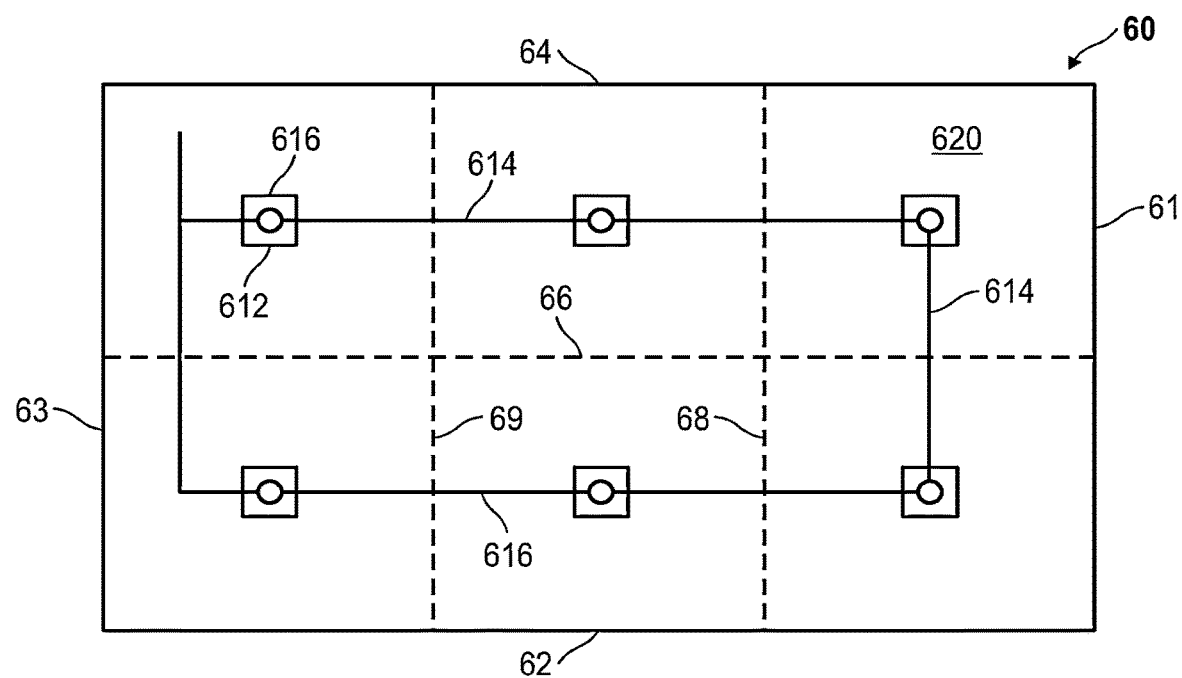
FIG. 5 is a plan view of conceptual sections of a building site with moisture distribution holes.
Figure 6:
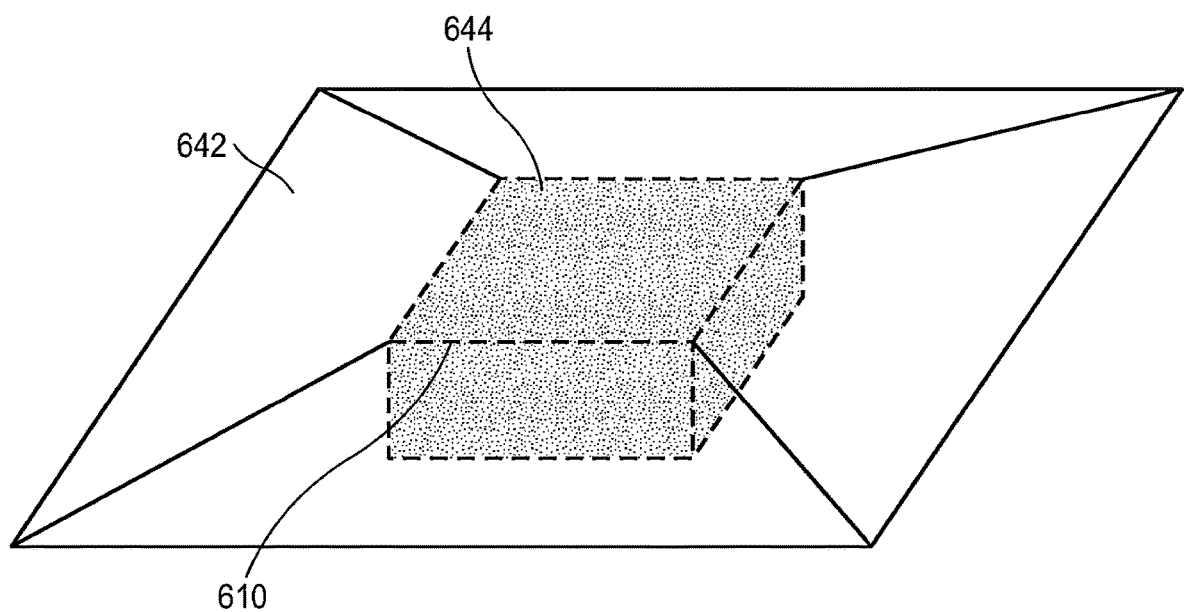
FIG. 6 is a perspective view of conceptual moisture distribution holes.

FIG. 5 represents an embodiment of this aspect of the invention. The tract 60 is conceptually subdivided into 10 foot squared by boundary lines 61, 62, 63, 64, 66, 68 and 69. Holes, 610, are placed in the center of the sections. In one embodiment the section will be about 10 feet square and the holes (slugs) about 1 foot square and 12 to 48 inches deep (preferably about 30 to 40 inches deep). FIG. 6 illustrates the holes or slugs, where 642 is the grade surface, 610 the hole and 644, the fill material. The fill may be supplied with liquid when installed and replenished manually or by, for example, with a conduits system (614 conduits, 612 drip members and 620 liquid supply means).

As in the treatment of the entire or sections of the site, it will, in many situations be desirable, and therefore as aspect of this invention, to place identifiers such as RFID chips, color or tags (such as small unique plastic pieces, beads, distinctive granular material and the like) placed in the fill.

In another set of embodiments are for soil moisture stabilization to an existing building site with a building in place, the system of this invention can be controlled to deliver water or other liquids to surrounding soil through a fluid distribution network. (Hereinafter, water will be generically used to represent any type of liquid suitable for transportation and distribution to soil). The system is installed generally below ground, and in a preferred embodiment, the system is installed adjacent to and about 18 to 24 inches away from the foundation and 12 to 24 inches below ground level, but may be disposed further from the foundation. The system comprises zones and each zone may comprise a network of sections that may or may not be connected together in predetermined increments.

Optimum moisture delivery is achieved through the control of moisture content and user intervention. In some embodiments a controller that enables each zone (if multiple zones exist) to water independently of the others. The irrigation controller can be used to control irrigation events through turning on/off irrigation valves.

When a zone is selected to be turned "on", the controller is set to deliver water to the zone. Liquid is then delivered to the liquid distribution system for distribution to the surrounding soil until the zone is turned "off" and water ceases to flow within the zone. The control of liquid to the zone(s) can be based on hydrological properties of soil in which the irrigation system will response according to water need. Hydraulics and flow are balanced to achieve accurate saturation.

It is therefore one aspect of the invention to provide a building foundation moisture stabilization system and method, comprising one or more zones, wherein a zone comprises a water delivery network that has conduit section(s) of predetermined length with at least one center-fed or end-fed length. Such a predetermined length could optimally be in the range of about 3 to 20 feet and preferably about 8 to 20. A controller governs the flow of water to the independent zones.

Figure 7:
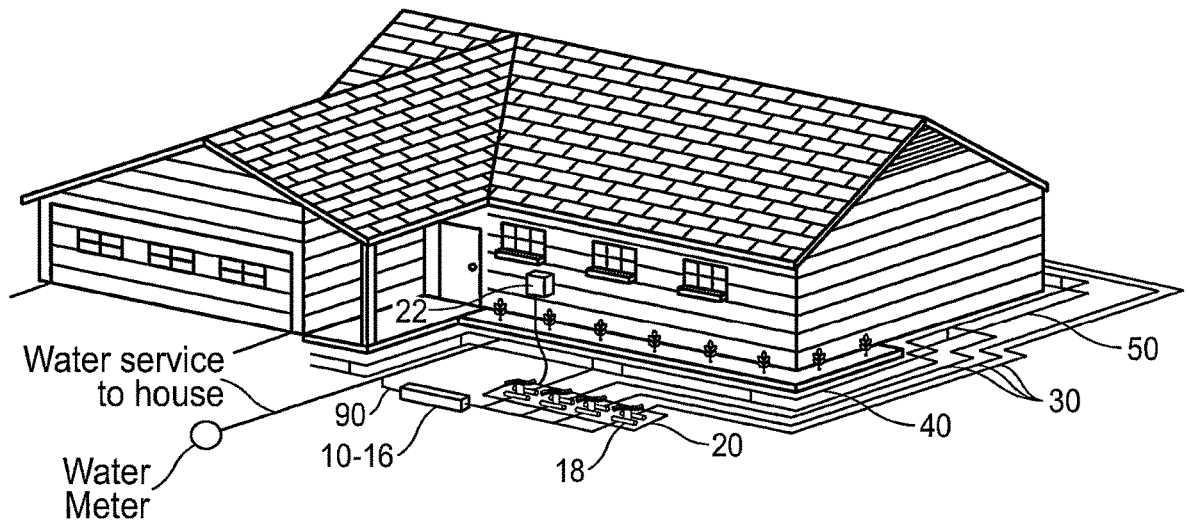
FIG. 7 is a schematic view of one embodiment of the invention showing a possible zone configuration.

Referring now to the figures of the drawing, FIG. 7 is an isometric view of a building showing four independent irrigation zones adjacent building structure where each zone includes multiple center-fed sections. In the example shown, one independent zone is used for each side of the structure (front, back and sides). The delivery system can be installed above or below ground, but in a preferred embodiment the system is subterranean and installed 18 to 24 inches away from the foundation and 12 to 36 inches below ground level. The system is tied into a main water supply line or other central liquid supply source in the manner and with the components 90 and 10-16 described below. The controller 22 controls the flow of water to the independent zones via the zone valves 18 installed in manifold 20. The conduit 30 feeds the porous liquid delivery conduit 40. Optimum moisture level may be achieved through manually or automatically monitoring moisture content and by user intervention.

Figure 7A:
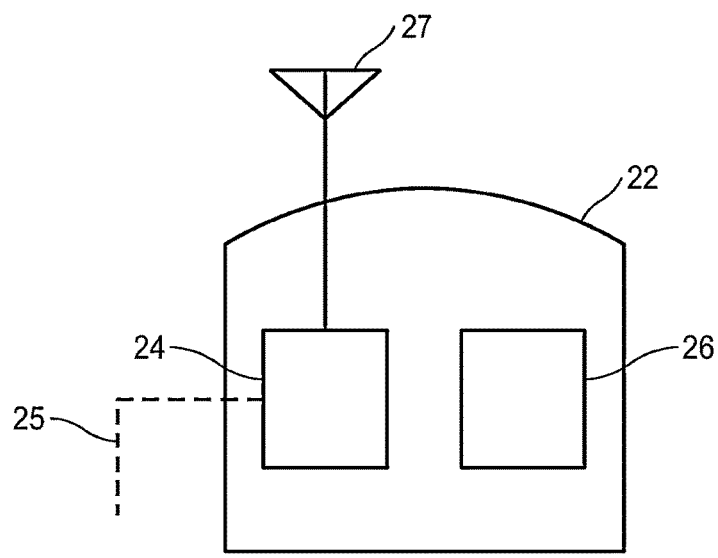
FIG. 7A is a schematic view of one embodiment of the invention showing a Control system.
Figure 8:
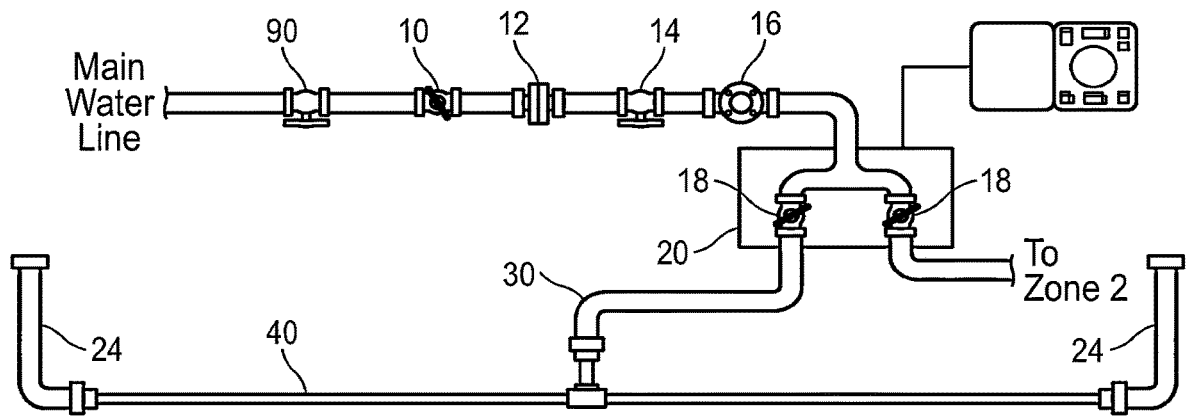
FIG. 8 is an isometric view of a building showing four independent zones around a building structure.

FIG. 8 is a schematic view of one embodiment of the invention showing a possible zone connection configuration. Each independent zone comprises a network of conduit 40. A backflow prevention device 10 may be installed and connected to a master valve 14. A strainer 12, such as a wye strainer, may also be installed on the main water line between the backflow device 10 and the master valve 14 to help keep undesirable substances out of the piping section in the event of a break. The master valve 14 may be installed with a pressure regulator 16 in order to regulate pressure to the zone valves 18. The zone valves 18 are installed in a manifold 20, which can be installed in a centrally located valve box. A controller 22 governs the flow of water to each of the zones via the zone valves 18, enabling each zone to water independently of the others. The controller 22 can be an active monitoring controller that is electronic or hydraulic. It can utilize a water or moisture sensor placed within the soil (as described below) or a timer which operates in any desired time increment (as determined by the specifications of the type of controller used, for example 1 minute to 6 hours) with multiple start and finish times available for each zone. Alternatively, controller 22 can be a passive controller which utilizes a floating cut-off or other passive flow control switching mechanism. The controller may be remotely controlled (see FIG. 7*a*). The remote control may be managed through a wired connection (25 in FIG. 7*a*) to a suitable device such as a computer terminal, computer tablet and the like or wireless through an antenna (27) or other suitable signal transmitting/receiving device(s). The control may be by internet, satellite, text message, etc. from a wireless phone or tablet, telephone line, cable, homeowners association network (or other community organization) and the like. Remote control can be easily designed by those skilled in the art and allows more flexibility in control of the option for maintaining balanced irrigation.

In operation water seeps through the drip conduit 40 into a liquid distribution trench as described below to moistens the surrounding soil until the zone is turned "off" and water ceases to flow within the zone. The hydraulics are balanced to achieve desirable soil moisture. This generally is accomplished in response to the hydrological properties of soil. A rain sensor may also be connected to the controller 22 to ensure that the system is not turned "on" when it is raining. Risers 24 with threaded caps can be installed below ground to allow for visual observation of the zone for proper flow and trouble-shooting or to allow flushing and/or other maintenance.

Figure 17A:
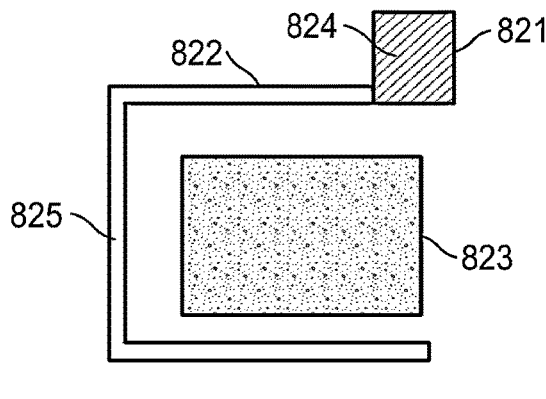
FIG. 17A is plan view of a water distribution system of an embodiment of the invention showing perforated pipes disposed in trenches around the perimeter of a building foundation.
Figure 17B:
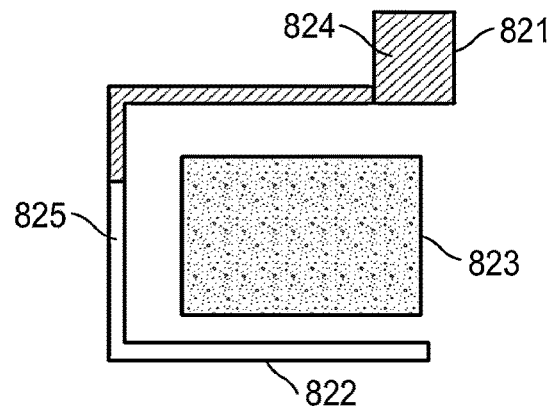
FIG. 17B is plan view of a water distribution system of an embodiment of the invention showing perforated pipes disposed in trenches around the perimeter of a building foundation.
Figure 17C:
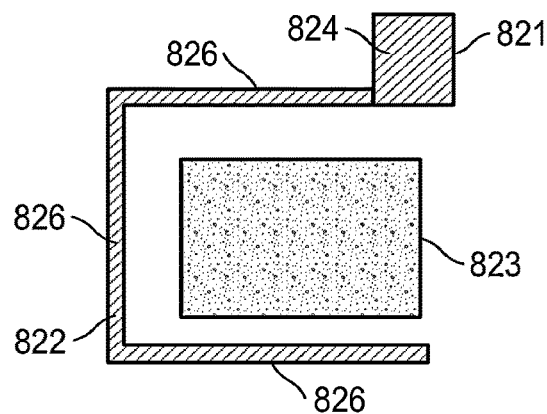
FIG. 17C is plan view of a water distribution system of an embodiment of the invention showing perforated pipes disposed in trenches around the perimeter of a building foundation.

U.S. provisional patent application No. 61/761,505 filed Feb. 6, 2013 describes a liquid supply system utilizing wicking rope for even distribution of liquid around a building foundation. Such a system is suitable for supplying moisture to the systems including the trenches and holes disclosed in the present invention. The disclosure of U.S. Ser. No. 61/761,505, filed Feb. 6, 2013 is incorporated herein by reference in its entirety for all purposes. U.S. provisional patent application No. 61/801,305 filed Mar. 15, 2013 describes a liquid supply system utilizing Tyvek™ fabric (a flash spun high-density polyethylene fiber fabric sold under the trademark Tyvek™) covered pipe for even distribution of liquid around a building foundation. Such a system is suitable for supplying moisture to the systems including the trenches and holes disclosed in the present invention. The disclosure of U.S. Ser. No. 61/801,305, filed Mar. 15, 2013 is incorporated herein by reference in its entirety for all purposes. The description and figures from the provisional application have been added to this application. These additions are to make the Drawings conform to the requisite standards and to place the description in a more suitable form for the specification. No new matter is added. Referring to FIGS. 17A, 17B and 17C, there is a water source 821. Perforated pipe 825 is encased in Tyvek™ fabric (a flash spun high-density polyethylene fiber fabric) is disposed in trenches around a building site 823 to allow a wicking or seeping effect to evenly distribute the water in the trenches. The trenches may have granular material and/or Pozzalan mineral disposed in them to aid in even dispersal of the moisture. When the pipe is filled with water the pressure of the water source causes the Tyvek™ sleeve (a sleeve made of flash spun high-density polyethylene fiber fabric) to allow water to seep out. Prior to that pressure caused by the water source on the filled pipe the water is contained in the pipe by the Tyvek™ sleeve. Tyvek™ fabric generally will not let water pass at a pressure of about 1 psi but will allow it to pass at higher pressures.

Figure 15:
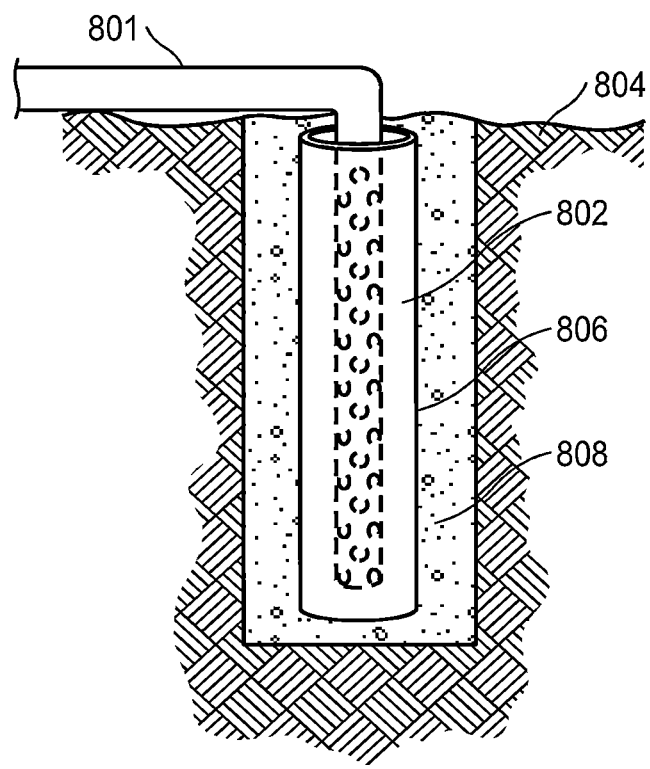
FIG. 15 is a schematic side plan view of one embodiment of the invention illustrating an embodiment of a liquid distribution holes of the invention with liquid barrier such as Tyvek™ fabric.
Figure 16:
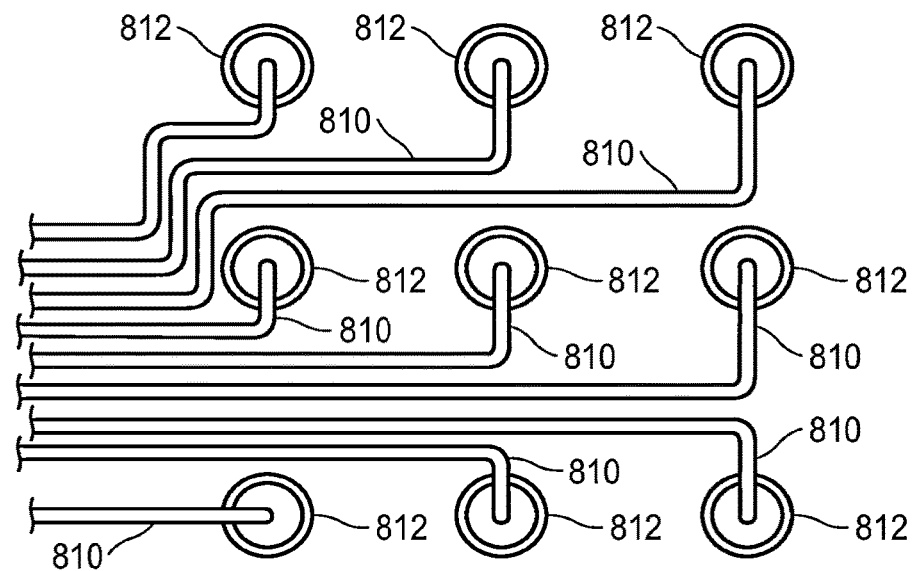
FIG. 16 is plan view of a water distribution system of an embodiment of the invention

FIG. 15 illustrates holes having a porous or open end pipe disposed in holes on a building site. Water is supplied by conduit 801 to the pipe 802 that is disposed in a sleeve 806 in the soil of a building site 804. The hole may also be filled with a granular material 808. FIG. 16 illustrated a suitable arrangement of pipes, 810, and holes 812.

Each zone may be center-fed with, for example, solid PVC pipe, polyethylene tubing or other suitable conduit. The solid conduit, illustratively, may center-feed the pipe 40 which, in turn, center-feeds the liquid distribution trench. Center-feeding the porous pipe 40 in 10 foot increments helps to ensure proper hydraulic flow throughout the zone; however, in order to maintain proper flow, it has been found that a liquid delivery zone should generally not exceed about 100 feet (preferably 80 feet) in linear run. Alternatively, each zone can be fed from one end, both ends and any combination of center-feeding and end-feeding.

The following brand-types and specifications for various components of the invention are included for exemplary purposes only:

Conduit consisting of PVC Pipe ¾" class 200—Rated for 200 psi 1 inch class 200—Rated for 200 psi (used to tie in main line) PVC Fittings Schedule 40 Poly Tubing ⅜ inch Nylon Zip-ties ⅛ inch times 6 inch' used to secure porous tubing to nylon fittings Porous Tubing ⅜ inch Nylon barbed ⅜ inch fittings.

The backflow prevention device could be supplied by Febco® a unit that includes a double-check assembly, pressure vacuum breaker, and atmospheric vacuum breaker. The device can be installed as needed or tied in from an existing irrigation system.

The electronic controller could be from the Rain Dial® Series from Irritrol® systems.

The valves could be the 700 series UltraFlow from Irritrol® systems.

The pressure regulator could be from Omni® from Irritrol® systems.

The liquid distribution system of this invention consists of zones each comprising a trench or ditch into which is disposed a soil moisture stabilization material, preferably granular, porous medium admixed with a water retaining component. Granular material may suitably be sand, finely divided gravel, crushed lava rock, crushed stone, rock, plastic pellets and the like. Generally some form of sand will be very suitable. The water retention component is a material that aids the porous material in retaining liquid so that it is passes through the granular material (and out) much slower than it would otherwise and preferably is pozzolan as described in detail above.

Figure 9:
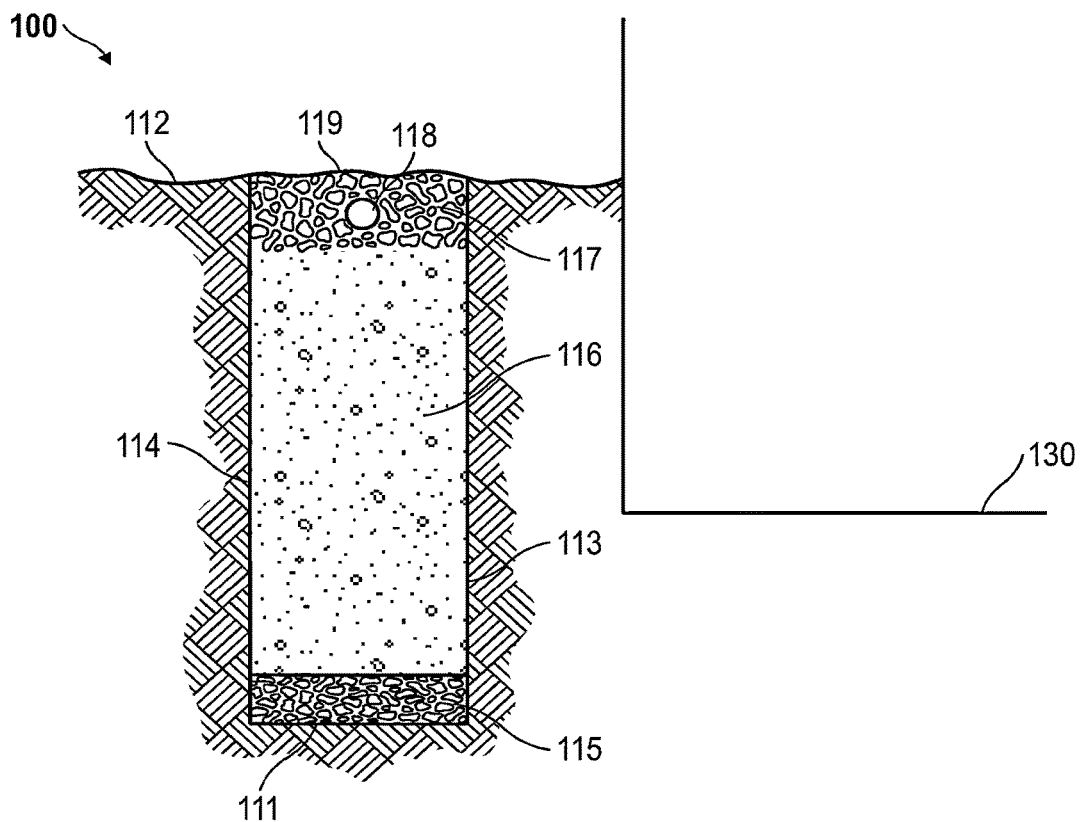
FIG. 9 is a schematic view showing an embodiment of a liquid distribution trench of the invention.

Referring to FIG. 9 an illustration of a cross section of one embodiment of the moisturizing liquid distribution trench of the invention, the trench 100 has vertical sides 113 and 114, a bottom 111 and top 119. The ground grade level is shown as 112 and a building foundation as 130. The trench 100 is optionally filled at the bottom with a few inches of gravel 115, the bulk or predominate volume of the trench is filled with granular material plus a liquid retaining component—preferably sand with a Pozzolan component as discussed above. At the top of the trench there is, optionally, top layer 117 and also, optionally, a cover 119. The top layer may be native soil, lava rock, mulch, polymer foam and the like. The trench may also be left uncovered (with the granular and liquid retaining component filled to the top) and used as a planting bed—the granular/pozzolan mixture is generally an excellent growing soil. Disposed in the top layer at grade level or up to 8 inches below grade is a drip irrigation conduit 118 that supplies liquid to the trench. The drip irrigation conduit distributed liquid from a central supply point to the liquid distribution trench and may be any suitable drip irrigation conduit such as PVC pipe polyethylene with drip holes, "soaking" hose and the like. As illustrative of a preferred embodiment the trench will be 6 to 24 inches wide (preferable 8-12 inches with a 9 inch width being very suitable for most situations). The trench is spaced at about 6 inches to 8 feet from the foundation 130 and preferably about 6 to 24 inches.

There may also be disposed in the trench liquid-retarding or barrier material(s) along the side or sides and bottom of the trench. For example, there may be a liquid barrier placed along the bottom 111, side 114 and/or the top 119. The barrier may be on only one side or bottom or on the bottom, side and top or any such combination. Generally there will not be a barrier at side 113—the side adjacent the building foundation. Suitable liquid barriers include flexible or rigid plastic sheet material, metal or plastic panels, concrete, asphalt or other suitable coating for the trench sides and any other suitable material that is capable of retarding or preventing liquid flow. The barrier may be placed in the trench before moisture stabilizing fill is added, may be incorporated with the fill or may be supplied as preassembled barriers that are manufactured offsite and delivered to the site and installed.

Figure 10:
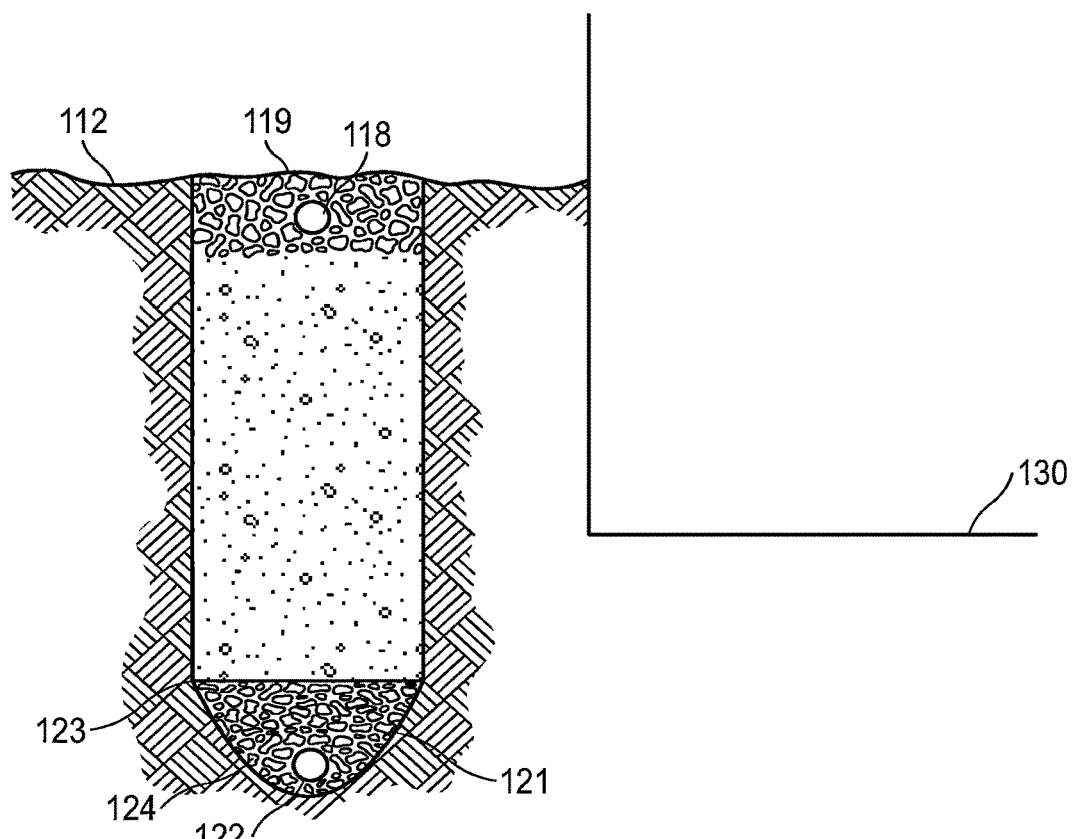
FIG. 10 is a schematic view of another embodiment of a liquid distribution trench of the invention with a bottom drain.
Figure 11:
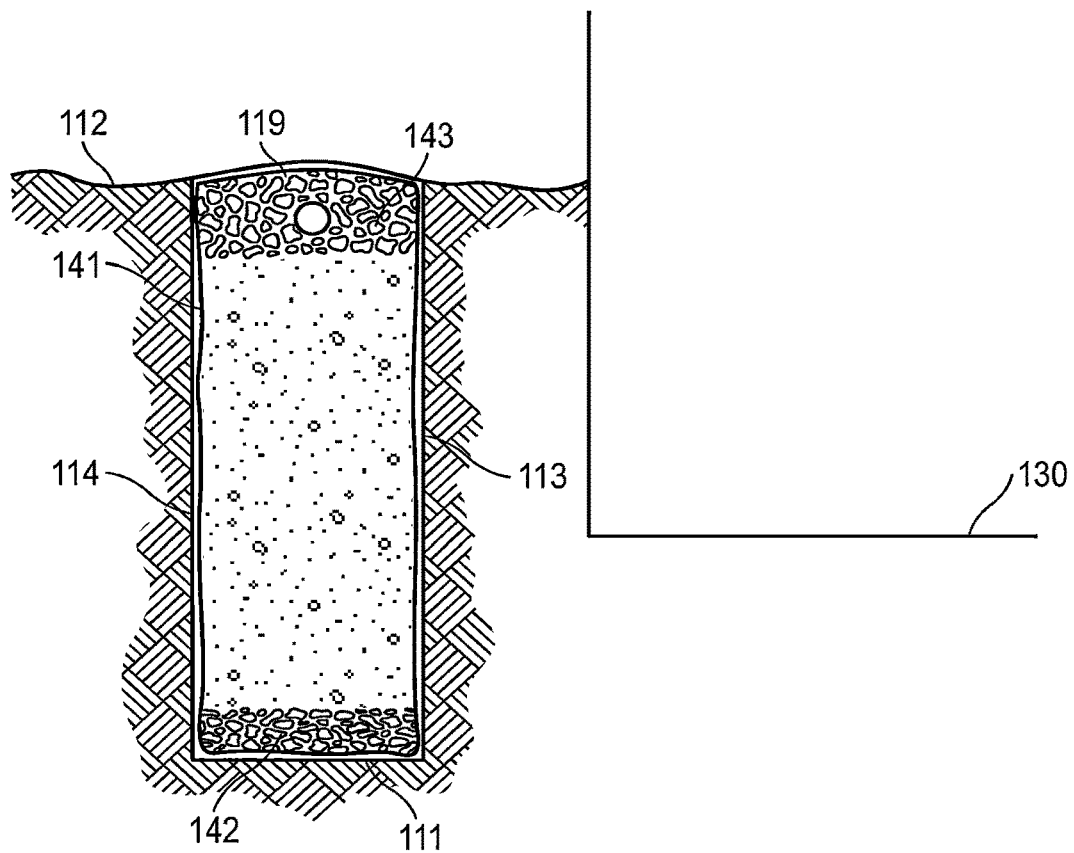
FIG. 11 is a schematic side plan view of one embodiment of the invention illustrating an embodiment of a liquid distribution trench of the invention with liquid barriers.

In another embodiment the trench may also be used to collect excess water, in case of severe rain or excessive watering event, and provides for means of drainage to permit the soil around the foundation to release excess water beyond its saturation level in the nature of a "French Drain". Gravel, rocks and other materials are used to allow easy movements of water at the bottom of the liquid distribution trench. An embodiment of this aspect is illustrated in FIG. 10 where 121 represent the walls of additional depth of trench beneath the trench 100. Generally this basin will be filled with gravel or other materials, 124, that facilitate water flow. There is a barrier 123 between the main trench and the drain. There is a drain conduit 122 in the bottom of the trench that allows water to enter and be drained off. The conduit 122 will be sloped along the length of the trench to facilitate discharge the excess liquid. The conduit may be any suitable material and design but generally will be PVC or polyethylene pipe or tubing with holes to allow liquid to enter—conventional drain pipe is very acceptable for this service in most situations.

The liquid distribution trench may be of varying lengths arranged in zones placed adjacent to and around a building foundation (as illustrated in FIG. 7). The zones may be of any length, from the length of a side of a building to individual predetermined lengths such as 4 to 12 foot. The length will be, to some extent, the user's choice but will also be influenced by the conditions of the site and the means that the granular material is disposed into the trench. There may be, for example, discontinuities in the trench at building doorways or walkways.

Figure 12:
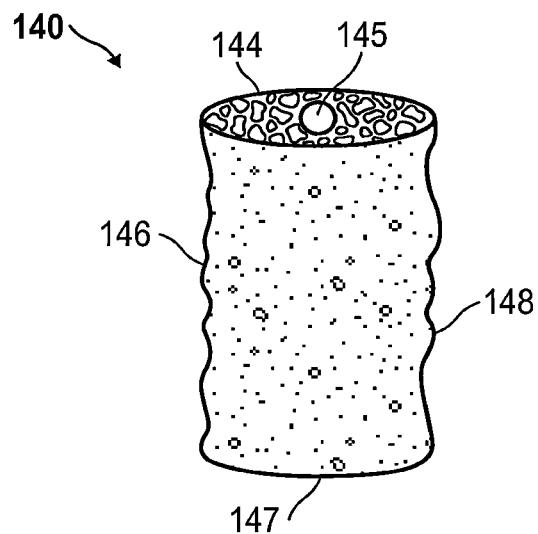
FIG. 12 is a schematic end view of one embodiment of the invention illustrating a prepackaged fill container.
Figure 13:
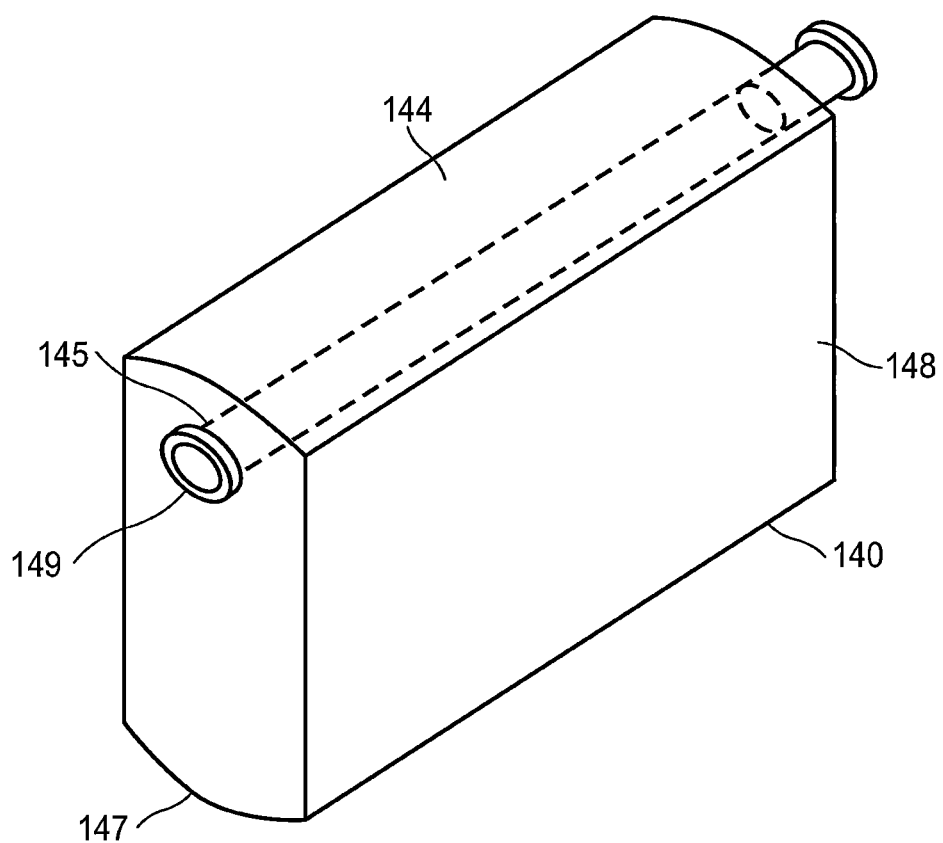
FIG. 13 is an isometric view of one embodiment of the invention illustrating a prepackaged fill container.

The soil moisture stabilization martial such as a mixture of granular material and pozzolan disposed in the trench may be mixed and compounded on site, may be premixed offsite and delivered to the site or may be, in one important embodiment, packaged into flexible containers (such as bags) that are placed into the trench. The container will generally be flexible bags that are porous at least on one side and may be of material that will decompose after time in place. An embodiment of prepackaged (bagged) fill material is illustrated in FIGS. 12 and 13. FIG. 12 6 shows an end view of a prepackaged fill container and fill. It is composed of flexible material 146, 147 and 148 that may be of the same or different materials. The material may be a plastic (polymer) fabric or something like burlap. The sides 146, 147 and/or 144 may be made of liquid barrier material and the side 148 (that will be placed facing the building foundation) of a porous or mesh material so that liquid will easily pass. FIG. 6 also illustrated a preinstalled drip conduit 145. FIG. 13 is a perspective view of the same prepackaged filled with preinstalled conduit 145 with connector 149 installed. The connector may be a "quick connect" fitting, pipe union or the like. As will be apparent there are many useful configurations for prepackaging the fill material that are within the scope of this invention. The containers or bags may be fitted with a liquid barrier sides and/or bottom (as illustrated in FIGS. 12 and 13) so that they are, in effect, totally self-contained and can be placed in a trench without need for further adaption. The containers may be of any convenient size and length, for example, they may be made into four and six foot lengths to allow flexibility in placing them in a trench. Exemplary of one of many possible embodiments, the containers of FIGS. 12 and 13 may be about 18 inches on the sides designated 146 and 148 and about 8-10 inches on the bottom (147) and be constructed of burlap or porous plastic fabric with additional liquid barrier material disposed on the bottom 147 and sides 46 and optionally on top 144 (generally will not have a barrier prepackaged on the top but one may be placed on top when the fill is in placed in a trench). The containers may also be made with lengths of drip conduit disposed in the top section with suitable connectors so that individual sections (single container) can be conveniently connected together. Containerizing the fill material will greatly facilitate installation particularly in locations that are difficult to reach with large equipment or crowded or constricted location locations such as will be the case with many existing buildings.

As with the other embodiments the fill material in the trenches and in the prepackaged containers will desirably contain markers such as tags, coloring and in preferred embodiments programmed RFID chips. RFID chips are relatively inexpensive and may be programmed with identifiers to allow monitoring of a variety of desirable information such as source, intellectual property rights and obligations, date of manufacture, date of application, composition, quantity of application and the like.

Figure 14:
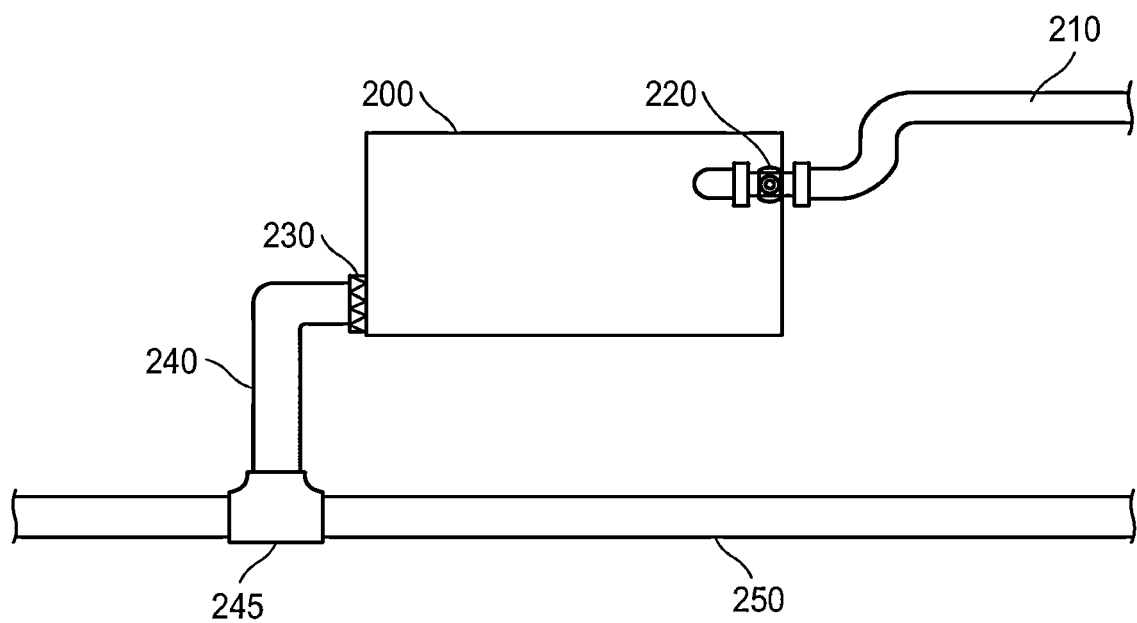
FIG. 14 is view of one embodiment of the invention illustrating a reservoir for delivering liquid to the system.

FIG. 14 illustrates another component of embodiments of this system. FIG. 14 shows a liquid distribution (as in FIGS. 7 and 8) having a liquid reservoir 200. The liquid reservoir 200 is connected to the liquid delivery conduit means 250 by conduit 240. This configuration provides some "head" (pressure of elevated liquid) to aid in the wicking speed of the rope.

The system consists of a reservoir 200 of water that has a liquid distribution conduit network 250 attached that runs parallel to the foundation. Water drains from the reservoir 200 and passes through the wicking means network 250 until the moisture content of the liquid distribution trench is at equilibrium moisture content with the soil in the vicinity of the trench system. Once this has been achieved, the reservoir 200 will stay at a substantially constant level.

A mesh screen 230 can potentially be installed between the reservoir 200 and the wicking material network 250 to prevent particles and debris from entering the wicking material network. The connection between the reservoir and the wicking material network can be made with a connection means 240, for example PVC pipe, and attached to the network 250 with an attachment means 245, for example collard compression fittings. If the water level in the reservoir 200 drops below a certain level, an auto-fill valve 220 is opened to fill the reservoir back to the normal level.

The system of FIG. 14 can be connected by connector 210 to conduit 30 (of FIG. 7) or it can be connected to existing hose bibs that access the internal water piping of a structure. Connector 210 potentially can be a flexible hose or rigid conduit and can include a pressure regulator, backflow prevention device and attachment means. For example, it may include a means to attach to conduit 30 or a hose bib on a house. The reservoir 200 should be placed near the center of the area to be watered and in an area that can be reached for maintenance. There can be one or more reservoirs for each zone. The liquid distribution trench network 250 should be placed at the base of the grade beam of a foundation (building slab), no further than ten feet away from the building foundation slab. Preferably it will be placed about 12 to 36 inches from the building foundation. In most situations placing it no more than about 24 inches from the slab will be suitable.

In another embodiment, it is possible to use this invention in any of the embodiments where liquid is distributed to transport and distribute other fluids such as pesticides or liquid fertilizers, for example in a garden or flower bed grown alongside a home or other structure. The system can be configured to distribute a desired amount of these fluids to soil and areas surrounding a foundation. A reservoir as described above will facilitate the use of other liquid components such as fertilizers and/or pesticides.

In the foregoing specification, the invention has been described with reference to specific embodiments thereof. It will, however, be evident that various modifications and changes can be made within the spirit and scope of the invention as will be apparent to those skilled in the art from this description and by practice of the invention without departing from the broader spirit and scope of the invention as set forth in the appended claims. The scope of the invention is not intended to be limited to the particular forms disclosed and the invention covers all modifications, equivalents, and alternatives falling within the spirit and scope of the invention as defined by the claims. The specification is, accordingly, to be regarded in an illustrative rather than a restrictive sense. Therefore, the scope of the invention should be limited only by the appended claims.

The invention claimed is:

1. A system, comprising:
a building slab comprising a plurality of concrete beams at a building foundation site; and
a liquid distribution system arranged to deliver a liquid to one or more locations under the building slab, wherein the liquid distribution system comprises:
one or more conduits comprising one or more supply ends and one or more delivery ends located under the building slab, the one or more conduits located at least partially in soil at the building foundation site, wherein the one or more conduits are configured to deliver the liquid from the one or more supply ends to the one or more delivery ends located under the building slab; and
the one or more delivery ends of the one or more conduits comprising porous conduit, disposed in respective fabric sleeves, to deliver the liquid into soil at the one or more locations under the building slab.

2. The system of claim 1, wherein at least a portion of the one or more conduits comprises polyethylene tubing.

3. The system of claim 1, wherein the one or more delivery ends of the one or more conduits comprise porous polyvinyl chloride (PVC) conduit encased in respective fabric sleeves to control release of the liquid into the soil at the one or more locations under the building slab.

4. The system of claim 3, wherein the respective fabric sleeves comprise flash spun high-density polyethylene fiber fabric.

5. The system of claim 1, wherein at least a portion of the one or more conduits comprise polyvinyl chloride (PVC).

6. The system of claim 1, wherein at least a portion of the one or more conduits is installed 12 to 36 inches below a surface of the soil on the building foundation site.

7. The system of claim 1, further comprising:
a controller configured to control, based on input from one or more sensors, flow of the liquid via the liquid distribution system to the one or more locations under the building slab.

8. The system of claim 1, wherein the respective fabric sleeves are made of a flash spun high-density polyethylene fiber fabric.

9. The system of claim 1, further comprising a liquid distribution trench at least partially located under a beam of the building slab and fed the liquid via the liquid distribution system, wherein at least a portion of the one or more conduits is located in the liquid distribution trench at least partially under a beam of the building slab.

10. The system of claim 1, wherein respective lengths of said porous conduit disposed in the respective fabric sleeves are oriented vertically.

11. A method, comprising:
installing a liquid distribution system at a building site such that the liquid distribution system is arranged to deliver a liquid to one or more locations below a surface of the building site, said installing comprising placing one or more conduits, comprising one or more supply ends and one or more delivery ends, at least partially in soil below the surface of the building site, wherein the one or more delivery ends of the one or more conduits comprise porous conduit disposed in respective fabric sleeves; and
placing or pouring a building foundation slab comprising a plurality of beams over at least the porous conduit disposed in respective fabric sleeves of the one or more delivery ends of the one or more conduits of the liquid distribution system;
wherein the porous conduit disposed in respective fabric sleeves are configured to deliver the liquid into the soil at the one or more locations under the building foundation slab.

12. The method of claim 11, comprising the steps of:
grading the building site to provide a surface for the building foundation slab; and
installing a controller configured to controllably supply a flow of the liquid to the one or more locations below a surface of the building site.

13. The method of claim 11, wherein the one or more conduits comprise polyethylene tubing.

14. The method of claim 11, wherein said installing a liquid distribution system comprises installing porous polyvinyl chloride (PVC) conduit encased in respective fabric sleeves at the delivery ends of the one or more conduits to control release of the liquid into the soil at the one or more locations under the building foundation slab.

15. The method of claim 14, wherein the respective fabric sleeves comprise flash spun high-density polyethylene fiber fabric.

16. The method of claim 11, wherein said placing one or more conduits in soil below the surface of the building site comprises placing polyvinyl chloride (PVC) conduit in soil below the surface of the building site.

17. The method of claim 11, wherein said placing one or more conduits in soil below the surface of the building site comprises placing the one or more conduits 12 to 36 inches below the surface of the building site.

18. The method of claim 11, further comprising installing a controller configured to control, based on input from one or more sensors, flow of the liquid via the liquid distribution system to the one or more locations under the building foundation slab.

19. The method of claim 11, wherein said installing a liquid distribution system at a building site comprises placing the one or more porous conduit disposed in respective fabric sleeves in soil below the surface of the building site such that a length of the porous conduit and the respective sleeve is oriented vertically.

20. The method of claim 11, wherein;
the respective sleeves are made of a flash spun high-density polyethylene fiber fabric; and
said placing one or more conduits comprising one or more supply ends and one or more delivery ends in soil below the surface of the building site comprises placing the respective fabric sleeves, made of the flash spun high-density polyethylene fiber fabric, in the soil below the surface of the building site.

* * * * *